United States Patent [19]

Komatsu

[11] 3,835,322
[45] Sept. 10, 1974

[54] METHOD AND APPARATUS FOR ANALYZING NITROGEN OXIDES IN GAS
[75] Inventor: Isamu Komatsu, Takahagi, Japan
[73] Assignee: Hitachi, Ltd., Tokyo, Japan
[22] Filed: Feb. 2, 1973
[21] Appl. No.: 329,119

[30] Foreign Application Priority Data
Feb. 4, 1972   Japan................................ 47-12215

[52] U.S. Cl................. 250/343, 250/345, 250/340, 250/373
[51] Int. Cl. ............................................ G01n 21/00
[58] Field of Search ........... 250/343, 352, 373, 340, 250/345

[56]   References Cited
UNITED STATES PATENTS

| | | | |
|---|---|---|---|
| 2,648,775 | 8/1953 | Waters............................. | 250/343 |
| 2,974,227 | 3/1961 | Fisher et al........................ | 250/373 |
| 3,005,097 | 10/1961 | Hummel............................ | 250/343 |
| 3,166,676 | 1/1965 | Robinson.......................... | 250/373 |
| 3,593,023 | 7/1971 | Dodson et al...................... | 250/343 |
| 3,696,247 | 10/1972 | McIntosh et al.................... | 250/345 |

*Primary Examiner*—James W. Lawrence
*Assistant Examiner*—B. C. Anderson
*Attorney, Agent, or Firm*—Craig & Antonelli

[57]   ABSTRACT

Nitrogen oxides in a gas, for example, flue gas from a boiler, are continuously analyzed by (*a*) adding ozone gas to the gas containing nitrogen oxides thereby converting the nitrogen oxides to dinitrogen pentaoxide, (*b*) thermally decomposing the dinitrogen pentaoxide in the gas to nitrogen dioxide at a temperature of 300° to 340°C, and (*c*) continuously measuring nitrogen dioxide content of gas by an optical analyzer, for example, dual wavelength, photoelectric type analyzer of ultraviolet and visible regions.

29 Claims, 4 Drawing Figures

METHOD AND APPARATUS FOR ANALYZING NITROGEN OXIDES IN GAS

This invention relates to a method and apparatus for continuously analyzing nitrogen oxides in a gas.

It is now necessary to measure the $SO_2$ content of flue gas as a source for air pollution, and it will surely be necessary in near future to measure the $NO_x$ content of the flue gas. Accordingly, a method and apparatus for continuously analyzing $No_x$ with a high reliability have been keenly desired.

At the present time, a few methods and apparatus for analyzing $NO_x$ have been proposed, but these have a problem in long-term, continuous use for the analysis of the flue gas from stationary gas source such as boiler, etc., because frequent maintenance is necessary owing to drifts of $NO_x$ detector itself or deterioration of devices constituting the apparatus, and reliability is considerably lowered thereby.

Therefore, it would be possible to apply a dual wave length, photoelectric type analyzer of visible region having a high reliability for a prolonged time without any maintenance to the $NO_x$ analysis, where the $NO_2$ analysis is a base. However, $NO_x$ in the flue gas consists largely of nitrogen monoxide, which will be hereinafter referred to as "NO," and thus it is necessary to find out a method for converting NO to $NO_2$ stably, continuously and with high efficiency without any maintenance for a prolonged period and any generation of secondary pollution.

Several methods have been reported for continuously analyzing $NO_x$ in various sample gases, but a particularly important point in the reported methods is a stable conversion of NO to $NO_2$ with a high efficiency and at a rate as high as possible.

The reported methods include (1) a method comprising adding air or oxygen to a sample gas and compressing the gas for a predetermined time, (2) a method comprising passing a sample gas through an oxidative solution containing potassium permanganate, etc., and (3) a method comprising contacting a sample gas with ozone.

In the case of the method (1), it takes a few minutes to convert NO to $NO_2$ even if the gas is compressed to 3 kg/cm² with oxygen, and thus the method (1) is not suitable for continuous analysis. In the case of the method (2), it is rather difficult to obtain a good conversion efficiency, and the oxidizing agent must be exchanged from time to time. Furthermore, there is a fear of generation of secondary pollution, such as water pollution, by the waste oxidizing agent. In the case of the method (3), as disclosed in Japanese Pat. Publication No. 21354/70 ("Method and Apparatus for Continuously Analyzing Nitrogen Oxides"), $NO_x$ can be very rapidly converted to dinitrogen pentaoxide showing a strong absorption at 5.8 μ of infrared absorption spectrum, when $NO_x$ is contacted with ozone for reaction, and thus an infra-red spectrophotometer can be utilized. Dinitrogen pentaoxide will be hereinafter referred to as "$N_2O_5$."

However, the infra-red spectrophotometer is readily influenced with moisture of the sample gas, and undergoes drifts. Thus, it is necessary to check the zero point and sensitivity of the infra-red spectrophotometer, at least once a week, with zero gas and standard gas of known concentration. That is, there is a problem in maintenance in the case of the method (3).

An object of the present invention is to provide a method and apparatus for measuring $NO_x$ content of a sample gas by oxidizing $NO_x$ in the sample gas to $N_2O_5$ with ozone according to the well known method, converting $N_2O_5$ to $NO_2$ stably, continuously and with a high efficiency without any maintenance for a prolonged period of time and any generation of secondary pollution, and measuring $NO_2$ content by a dual wavelength, photoelectric type analyzer of visible region.

The present invention is based on the following chemical equations. Equations for contact reaction of $NO_x$ with ozone are given below (Japanese Pat. Publication No. 21354/70):

$$2NO + 3O_3 = N_2O_5 + 3O_2$$

(1)

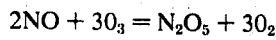

$$2NO_2 + O_3 = N_2O_5 + O_2$$

(2)

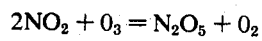

It is seen from the equations (1) and (2) that NO and $N_2O_5$ can be completely converted to $N_2O_5$, when ozone is added thereto in moles at least 1.5 times as much as that of NO and at least 0.5 times as much as that of $NO_2$. Furthermore, the time required for the conversion to $N_2O_5$ is not more than about one second.

$N_2O_5$ is gradually decomposed to $NO_2$ even at the normal temperature according to the following equation (3):

$$N_2O_5 \rightarrow 2NO_2 + \tfrac{1}{2} O_2$$

(3)

However, $N_2O_5$ has a boiling point (decomposition) of 47°C, and therefore, it is presumed that the rate of decomposition can be accelerated by heating.

When superheated, $NO_2$ is decomposed to NO according to the following equation (4):

$$2NO_2 \underset{\text{cooling}}{\overset{\text{heating}}{\rightleftarrows}} 2NO + O_2 \quad (4)$$

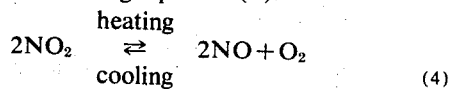

Therefore, it is seen from the equations (3) and (4) that there is an optimum heating temperature in the decomposition of $N_2O_5$ to $NO_2$.

Now, the present invention will be explained in detail by way of the accompanying drawings.

Figure 1:
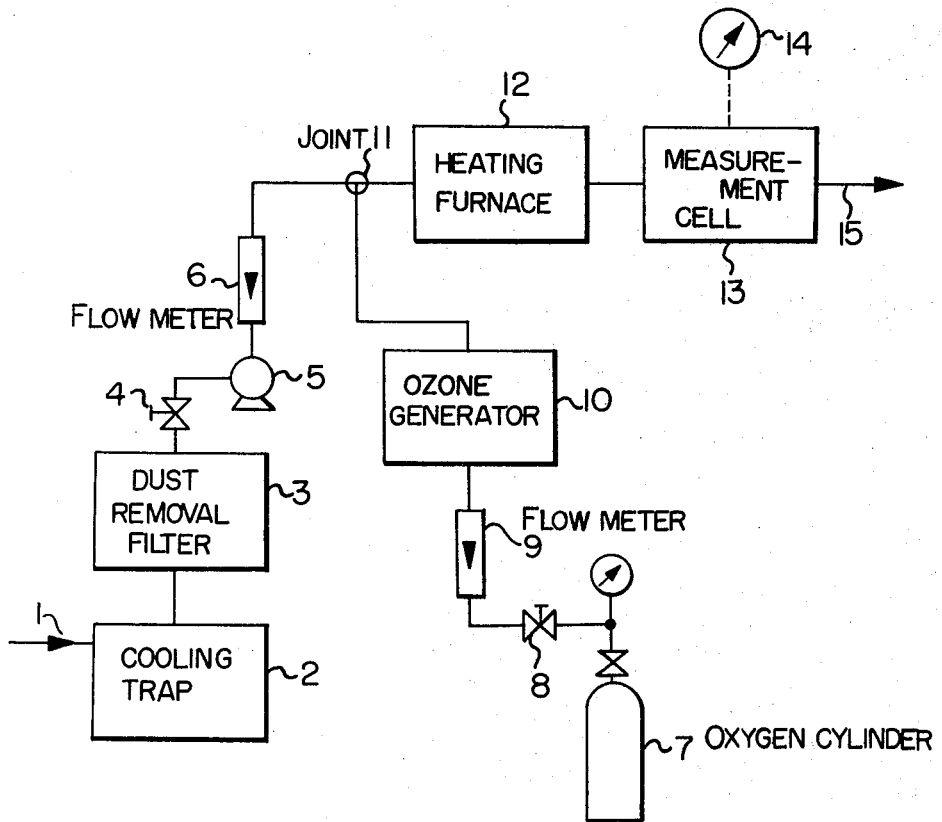
FIG. 1 shows one embodiment of the present invention.

In FIG. 1, a system, in which the present invention is applied to an apparatus for continuously analyzing $NO_x$ in the flue gas, is illustrated. A sample of flue gas 1 is passed through a cooling trap (dehumidifier) 2, a dust removal filter 3, and a throttling valve 4, whereby the flow rate of the sample is controlled. Then, the sample is passed through a flow meter 6 and is led to a joint part 11 at a constant flow rate. On the other hand, an oxygen cylinder 7 is controlled with respect to the flow rate by a throttling valve 8, and oxygen is led from the oxygen cylinder 7 to an ozone generator 10 at a constant flow rate through a flow meter 9. At that time, the flow rate of oxygen is set so that the moles of ozone in the oxygen may be at least 1.5 times the maximum moles of $NO_x$ in the sample gas. A gas mixture of oxygen and ozone leaving the ozone generator 10 is led to the joint part 11, and is brought into contact with the sample gas there. $NO_x$ is reacted with ozone and oxidized to $N_2O_5$. Then, the sample gas mixture is passed through a heating furnance 12, where $N_2O_5$ in the sample gas mixture is decomposed to $NO_2$, and excess ozone is also decomposed to oxygen, and then led to a measurement cell 13 of a dual wavelength, photoelectric type analyzer.

Figure 2:
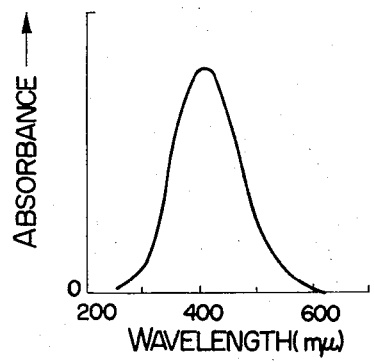
FIG. 2 shows an absorption spectrum diagram of nitrogen dioxide.

Now, experimental results when an NO-mixed standard gas in $N_2$ was used as a sample gas will be described below:

As shown in FIG. 2, the absorption spectrum of $NO_2$ has a maximum absorption at wavelength of about 400 m$\mu$, and has no absorption almost at all at wavelength of 610 m$\mu$. Thus, the measurement wavelength of the dual wavelength photoelectric type analyzer was set to 405 m$\mu$, and the reference wavelength to 610 m$\mu$.

The flow rate of the sample gas was adjusted to constant 1 l/min., and the flow rate of oxygen to constat 0.2 l/min., and the following experiment was carried out.

First of all, the optimum temperature of the heating furnance for decomposing $N_2O_5$ in the sample gas oxidized by ozone to $NO_2$ was determined. Its experimental result is given in FIG. 3.

Figure 3:
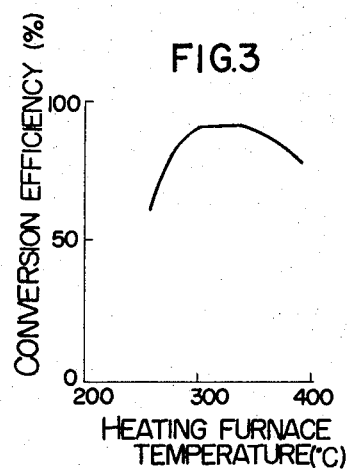
FIG. 3 is a diagram showing a relation between the heating temperature of dinitrogen pentaoxide and conversion efficiency to nitrogen dioxide.

Heating furnace temperature of FIG. 3 is a temperature of heating section almost at the center of the heating furnace containing a stainless steel pipe, 6 mm in outer diameter, which was properly insulated and wound with an electric heating wire and had a heating section, about 200 mm long. It was found that the optimum temperature was about 320° ± 20°C.

Then, indication characteristics were investigated by changing NO concentrations in $N_2$ sample gas. The heating furnace temperature was 320° ± 5°C at that time. The experimental results are shown in FIG. 4.

Figure 4:
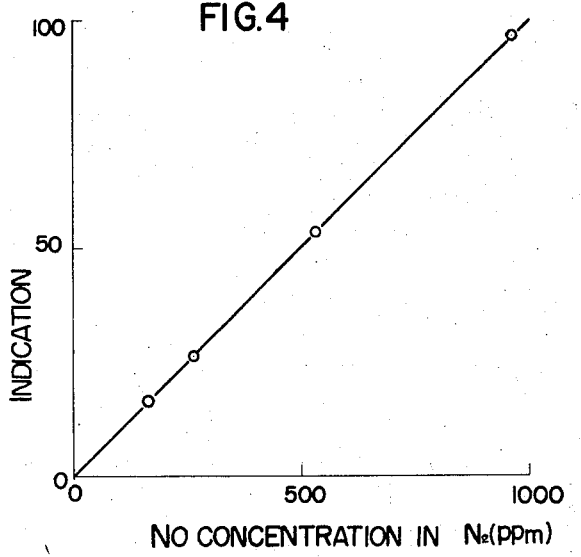
FIG. 4 is a diagram showing NO concentrations in $N_2$ measured according to the embodiment as shown in FIG. 1.

As is clear from FIG. 4, the indication has a good linearity, and the conversion efficiency of NO to $NO_2$ is almost 100 percent. From these results, it is apparent that the method for conversion of the present invention is very effective.

In the present invention of converting $NO_x$ in the sample gas to $NO_2$, optical analyzers for analyzing $NO_2$ such as two-light path, spectrophotometers of ultra-violet region and visible region having a standard cell and a measurement cell, or infra-red spectrophotometers can be used in place of the dual wavelength, photoelectric type analyzer of ultra-violet region and visible region, as shown in FIG. 1.

Further, an intermittent colorimetric method using Saltzmann reagent as set forth in Japan Industrial Standard JIS K0104-1968 can be used in the present invention.

According to the present invention, the following effects can be obtained.

1. $NO_x$ in various sample gases can be converted to $NO_2$ continuously with a high efficiency by simple modification of the conventional analyzer, for example, by supplementing the conventional sampling system with an ozone supply source and a heating furnace, and continuous analysis is possible thereby. In other words, the maintenance is simple.

2. Optimum temperature range of the heating furnace is broad, and thus the temperature control is simple.

3. Excess ozone is thermally decomposed to oxygen, and there is no fear of secondary pollution due to ozone.

4. It is possible to use oxygen from water electrolysis cell, etc. in place of the oxygen from the oxygen cylinder.

5. It is not necessary at all to exchange an oxidizing agent.

6. Since dinitrogen pentaoxide is heated and decomposed to nitrogen dioxide, and nitrogen dioxide is measured by an optical analyzer of visible range, the moisture in the nitrogen dioxide gas has no influence at all, even the moisture remains therein.

The present invention is applicable to all the methods for analyzing nitrogen oxides through conversion of the nitrogen oxides to nitrogen dioxide.

What is claimed is:

1. A method for analyzing the total nitrogen oxide content of a sample gas containing NO and $NO_2$, said method comprising:
   a. reacting a sample gas containing NO and $NO_2$ with sufficient ozone gas to convert the NO and $NO_2$ to $N_2O_5$,
   b. heating the gas so obtained and containing the resultant $N_2O_5$ to decompose $N_2O_5$ into $NO_2$ and $O_2$, and
   c. continuously measuring the concentration of the $NO_2$ generated by the decomposition of $N_2O_5$ in the heated gas.

2. A method according to claim 1, wherein the amount of ozone gas reacted with said sample gas is at least 1.5 times as much as the amount of NO and $NO_2$ in said sample gas on a molar basis.

3. A method according to claim 1, wherein the temperature to which the gas containing $N_2O_5$ is heated is selected to maximize the conversion efficiency of the $N_2O_5$ decomposition reaction.

4. A method according to claim 1, wherein the temperature to which the gas containing $N_2O_5$ is heated is maintained within a range such that the conversion efficiency of the $N_2O_5$ decomposition reaction is kept substantially constant.

5. A method according to claim 4, wherein the temperature range for the decomposition of $N_2O_5$ into $NO_2$ and $O_2$ is about 300°C to 340°C.

6. A method according to claim 1, wherein the concentration of $NO_2$ resulting from the decomposition of $N_2O_5$ by heating is optically measured by absorbency of light beams having a specific wavelength.

7. A method according to claim 6, wherein at least one of said light beams has a wavelength from about 250 to 600m$\mu$.

8. A method according to claim 7, wherein at least one of said light beams has a wavelength of about 405m$\mu$.

9. A method according to claim 8, wherein another of said light beams has a wavelength outside of the absorbence spectrum of $NO_2$.

10. A method according to claim 9, wherein said another of said light beams has a wavelength of about 610m$\mu$.

11. A method according to claim 6, wherein the concentration of $NO_2$ resulting from the decomposition of $N_2O_5$ by heating is measured by a dual wavelength spectrophotometer.

12. A method according to claim 11, wherein said dual wavelength spectrophotometer covers the spectrum range of about 250 to 600m$\mu$.

13. A method according to claim 6, wherein the concentration of $NO_2$ resulting from the decomposition of $N_2O_5$ by heating is measured by a two-light path spectrophotometer.

14. A method according to claim 13, wherein said two-light path spectrophotometer covers the spectrum range of about 250 to 600m$\mu$.

15. A method according to claim 1, wherein the concentration of $NO_2$ resulting from the decomposition of $N_2O_5$ by heating is measured by intermittent colorimetry.

16. A method according to claim 1, wherein the ozone gas reacted with said sample gas is in the form of a mixture of ozone gas and $O_2$ gas.

17. An apparatus for analyzing the total nitrogen oxide concentration of a sample gas containing NO and $NO_2$, said apparatus comprising:
   a. sample inlet means for sampling a sample gas containing NO and $NO_2$,
   b. ozone supply means for supplying $O_3$ gas,
   c. mixing means for mixing sample gas containing NO and $NO_2$ from said sample inlet means with $O_3$ gas from said ozone supply means, thereby converting NO and $NO_2$ into $N_2O_5$,
   d. heating means connected to said mixing means for decomposing $N_2O_5$ in the gas mixture into $NO_2$ and $O_2$, and
   e. measuring means connected to a downstream side of said heating means for measuring the concentration of $NO_2$ generated by the decomposition of $N_2O_5$ in said heating means.

18. An apparatus according to claim 17, wherein said measuring means is an optical measuring means capable of measuring the absorbence of light beams having a specific wavelength.

19. The apparatus according to claim 18, wherein said measuring means is a dual wavelength spectrophotometer.

20. The apparatus according to claim 19, wherein said dual wavelength spectrophotometer is capable of covering the spectrum range of about 250 to 600m$\mu$.

21. The apparatus according to claim 18, wherein said measuring means is a two-light path spectrophotometer.

22. The apparatus according to claim 21, wherein said two-light path spectrophotometer is capable of covering the spectrum range of about 250 to 600m$\mu$.

23. The apparatus according to claim 18, further including a demoistening means fluidly connected to said sample inlet means upstream of said measuring means for removing moisture from the same gas containing NO and $NO_2$.

24. The apparatus according to claim 18, further including filtering means fluidly connected to said sample inlet means upstream of said measuring means for providing dust from said sample gas.

25. An apparatus according to claim 18, further including fluid controlling means upstream of said mixing means for controlling the mixing ratio of the sample gas and ozone gas mixed in said mixing means.

26. An apparatus according to claim 18, further including temperature control means for controlling the temperature of said heating means.

27. An apparatus according to claim 18, wherein said ozone supply means includes means for generating $O_3$ gas from $O_2$ gas.

28. An apparatus according to claim 27, wherein said ozone supply means further includes an $O_2$ gas supply means.

29. An apparatus for analyzing the total nitrogen oxide concentration of a sample gas containing NO and $NO_2$, said apparatus comprising:
   a. sample inlet means for receiving a sample gas,
   b. means for introducing $O_3$ gas into said sample gas, thereby converting NO and $NO_2$ into $N_2O_5$,
   c. heating means fluidly connected to said inlet means downstream of a point of introduction of the $O_3$ gas for decomposing $N_2O_5$ in the resultant gas into $N_2$ and $O_2$, and
   d. measuring means connected to a downstream side of said heating means for measuring the concentration of $NO_2$ generated by the decomposition of $N_2O_5$ in said heating means.

* * * * *